United States Patent
Simitsis et al.

(10) Patent No.: US 10,747,762 B2
(45) Date of Patent: Aug. 18, 2020

(54) AUTOMATIC GENERATION OF SUB-QUERIES

(71) Applicant: ENTIT SOFTWARE LLC, Sanford, NC (US)

(72) Inventors: Alkiviadis Simitsis, Santa Clara, CA (US); William K. Wilkinson, San Mateo, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 272 days.

(21) Appl. No.: 15/310,120

(22) PCT Filed: Jun. 30, 2014

(86) PCT No.: PCT/US2014/044932
§ 371 (c)(1),
(2) Date: Nov. 10, 2016

(87) PCT Pub. No.: WO2016/003427
PCT Pub. Date: Jan. 7, 2016

(65) Prior Publication Data
US 2017/0161323 A1   Jun. 8, 2017

(51) Int. Cl.
*G06F 16/00* (2019.01)
*G06F 16/2453* (2019.01)
*G06F 16/248* (2019.01)

(52) U.S. Cl.
CPC ...... *G06F 16/24535* (2019.01); *G06F 16/248* (2019.01)

(58) Field of Classification Search
CPC ......... G06F 17/30442; G06F 17/30451; G06F 17/30997; G06F 17/30554; G06F 17/30445; G06F 17/30339; G06F 17/30935; G06F 17/30595; G06F 17/30598;
(Continued)

(56) References Cited

U.S. PATENT DOCUMENTS 6,965,891 B1 * 11/2005 Jakobsson ........... G06F 16/2264
                                                                  707/714
7,051,034 B1 *  5/2006 Ghosh ................ G06F 16/90335
                                                                  707/718
7,437,349 B2   10/2008 Basu et al.
(Continued)

OTHER PUBLICATIONS

Gupta, R. et al.; "Query Planning for Continuous Aggregation Queries Over a Network of Data Aggregators"; Published: Jun. 2012; <http://spwecedu.net63.net/Docs/Project/Dot%20NET/Query%20Planning%20for%20Continuous%20Aggregation%20Queries%20over%20a%20Network%20of%20Data%20Aggregators.bak.bak.pdf>.

*Primary Examiner* — Michelle N Owyang (57) ABSTRACT

Example implementations relate to automatic generation of sub-queries. For example, a computing device may include a processor. The processor may receive a query defining a particular set of data stored in at least one database. The processor may access metadata associated with the particular set of data and may select a data attribute associated with the particular set of data based on the metadata. The processor may automatically generate sub-queries of the query using the data attribute selected based on the metadata. The processor may process the sub-queries and provide a query result of the query that is a combination of sub-query results of the sub-queries.

20 Claims, 4 Drawing Sheets

(58) Field of Classification Search
CPC ......... G06F 17/30823; G06F 17/30867; G06F 17/30932; G06F 16/24535; G06F 16/248
USPC .................................................. 707/705–780
See application file for complete search history.

(56) References Cited

U.S. PATENT DOCUMENTS

| | | | |
|---|---|---|---|
| 8,126,870 B2 | 2/2012 | Chowdhuri et al. | |
| 8,375,029 B2 | 2/2013 | Cui et al. | |
| 8,386,508 B2 | 2/2013 | Krishnamoorthy et al. | |
| 8,423,569 B2 | 4/2013 | Dettinger et al. | |
| 8,521,718 B1* | 8/2013 | Chamberlain | G06F 16/2458 |
| | | | 707/709 |
| 8,521,723 B1* | 8/2013 | Ahmed | G06F 16/24534 |
| | | | 707/714 |
| 8,655,867 B2 | 2/2014 | Collins et al. | |
| 8,671,091 B2* | 3/2014 | Cherniack | G06F 16/24544 |
| | | | 707/714 |
| 9,372,889 B1* | 6/2016 | Jakobsson | G06F 17/30463 |
| 9,633,073 B1* | 4/2017 | Allen | G06F 16/245 |
| 10,102,248 B2* | 10/2018 | Kang | G06F 16/24544 |
| 2007/0005571 A1* | 1/2007 | Brewer | G06F 17/30265 |
| 2007/0061318 A1* | 3/2007 | Azizi | G06F 17/30386 |
| 2007/0219943 A1 | 9/2007 | Draughn | |
| 2008/0010268 A1* | 1/2008 | Liao | G06F 17/30672 |
| 2008/0319969 A1* | 12/2008 | Dettinger | G06F 16/2428 |
| 2009/0083238 A1* | 3/2009 | Chaudhuri | G06F 16/24561 |
| 2009/0271385 A1* | 10/2009 | Krishnamoorthy | ......................... G06F 16/24532 |
| 2010/0094829 A1* | 4/2010 | Castellanos | G06F 16/217 |
| | | | 707/705 |
| 2011/0153594 A1* | 6/2011 | Hagenbuch | G06F 17/30306 |
| | | | 707/718 |
| 2011/0258212 A1 | 10/2011 | Lu et al. | |
| 2011/0302164 A1 | 12/2011 | Krishnamurthy et al. | |
| 2013/0311442 A1 | 11/2013 | Weber et al. | |
| 2017/0004173 A1* | 1/2017 | Simitsis | G06F 16/24542 |

* cited by examiner

AUTOMATIC GENERATION OF SUB-QUERIES

BACKGROUND

Many entities utilize databases for storage of data relating to the entity. For example, a company may store data relating to the company's sales. Data stored in these databases may be accessed and analyzed for various purposes.

BRIEF DESCRIPTION OF THE DRAWINGS

Some examples of the present application are described with respect to the following figures.

DETAILED DESCRIPTION

As described above, data stored in a database may be accessed and analyzed for various purposes. A query of the data may indicate a particular set of data that is being requested. For example, an employee of a grocery store may wish to analyze sales for a particular month and may query the database for this particular set of sales data. However, for databases containing large amounts of data, a query for a set of data may be time-consuming and may utilize a large amount of memory resources while the query is being run.

To more efficiently run a query of data stored in one or more databases, the query may be automatically transformed into a functionally-equivalent form using a workflow of smaller sub-queries. Each sub-query may process a disjoint subset of the input to the original query, each providing a partial result of the original query. The results of each sub-query may be combined to produce a result identical to the result that would have been produced by running the original query itself. The sub-queries may each maintain the same general structure as the original query but may be collectively performed faster than performing the original query.

The automatic generation of sub-queries may be performed in response to receiving a query for a particular set of data stored in any suitable database. For example, the automatic generation of sub-queries may be performed for long-running, analytic queries (e.g., in a declarative query language) over a relational (e.g., SQL) database. While the automatic generation of sub-queries is described in the context of example databases, the technology may be extended to queries or flows spanning multiple engines as well, such as dataflow engines, workflow engines, time to live (TTL) flow engines, massively parallel processing engines, and the like. For example, a flow spanning a Hadoop engine and a database engine may use data partitioning either for the entire flow (e.g., using a merge operation toward the end of the flow) or across engines.

The following is an example of using automatically-generated sub-queries to process a query for a particular set of data stored in a database. For example, assume a database that stores fact tables and dimension tables. Fact tables may be relatively larger than dimension tables and may frequently receive data describing real-world events. For example, a fact table may include data indicating that customer X purchased item Y at store Z at time W in quantity Q for price P. A fact table may record measures of an event (e.g., quantity, price, etc.) while other descriptive attributes of the event (e.g., customer name, age, store location, day and time, item color, size, weight, etc.) may be recorded in dimension tables that may be referenced by the fact table. The fact table may contain key values that reference the descriptive attributes recorded in dimension tables. In some examples, a key value in a fact table may be an integer that may be mapped to a corresponding entry in a dimension table. A dimension table may be relatively stable compared to a fact table and may be slow-changing (e.g., store information), while a fact table may change more quickly as new fact events are received more frequently (e.g., a customer purchase). In some examples, dimension tables may be smaller than fact tables. This type of database organization may sometimes be referred to as a star schema because a central fact table may be linked (e.g., by key values) to dimension tables.

In this example, the dimension tables may include a customer table containing customer attribute information (e.g., customer name, address, account number, etc.), an item table containing item attribute information (e.g., item color, size, price, etc.), a store table containing store attribute information (e.g., store address, store type, etc.), and a date table containing date attribute information (e.g., time of day, day, month, year, etc.). A star query may be performed to retrieve all events with certain specified attributes. When the query is received, the query is altered in a parameterized manner such that each value of the parameter creates a query variant that returns a disjoint subset of the original query result and such that these intermediate results may be combined to form the complete result of the original query. In some examples, the key values that link the fact table to the dimension tables may be used to automatically generate sub-queries. For example, assume that the key values are integer values. A dimension table used in the query may be selected, and a fitter condition may be added to the key value related to the selected dimension table. For example, suppose the original star query is:

Select price, quantity from SalesFact where dateKey>d1 and dateKey<d2

This may be rewritten into sub-queries as:

Select price, quantity from SalesFact where dateKey>d1 and dateKey<d2 and (dateKey modulo 10)=0

Assuming roughly equal distribution of dates, the sub-queries may return approximately ten percent of the results of the original query. The remaining query results may be obtained by generating nine additional queries using parameter values 1, 2, . . . 9 for the matching value of the modulo function. Assuming these queries store their immediate results in temporary tables in the database, the final query result may be obtained by concatenating the temporary tables. Any sort order, limit cause, and the like that is to be implemented on the original query results may be replicated on the final query result from the sub-queries.

In some examples, if the original query contains filter conditions on other attributes (e.g., store region=California), the sub-query approach may still be performed. However, in this case, the query technology may choose which attribute to parameterize (e.g., an attribute from a dimension table, a key value attribute, etc.). The attribute to be parameterized may be selected using metadata associated with the table for the attribute. The metadata may indicate properties of the data in a table (e.g., cardinality of referenced attributes, uniqueness, etc.), and these properties may be used to determine which attribute to select for parameterization. For example, the metadata may indicate that generating sub-queries based on parameterizing store locations is more efficient than parameterizing other attributes, and as such, the sub-queries may be generated based on store locations.

While the example above was described in terms of fact and dimension tables, one of ordinary skill in the art will recognize that a similar approach may be used for any arbitrary analytic queries and table organizations by analyzing the query structure and using table metadata associated with the database used. In some examples, the query structure may be obtained from the database system explain plan, and the query metadata may be obtained from the database system.

Figure 1:
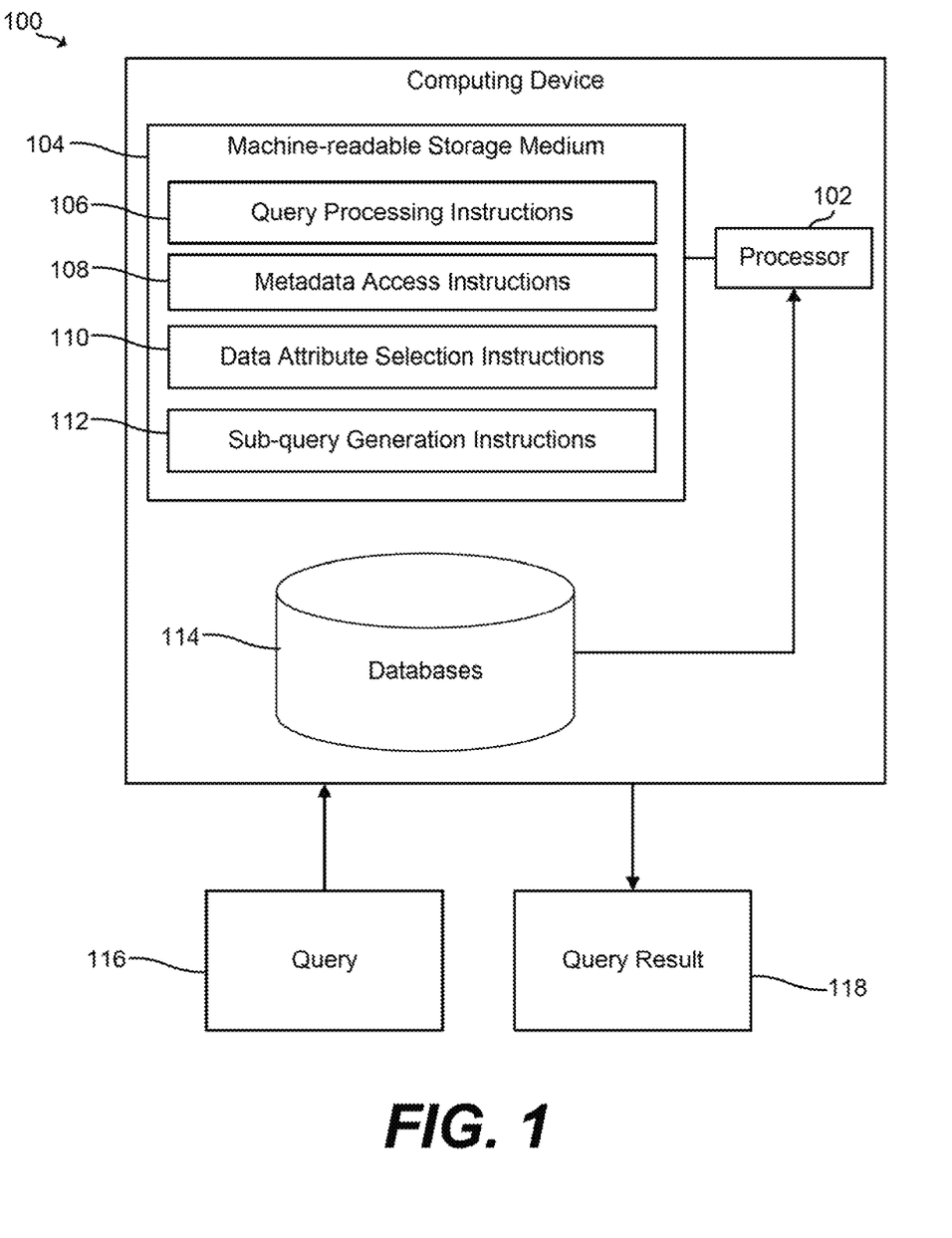
FIG. 1 is a block diagram of an example computing device for automatically generating sub-queries.

Referring now to the figures, FIG. 1 is a block diagram of an example computing device 100 for automatically generating sub-queries. The sub-queries may be automatically generated in response to receiving a query requesting a particular set of data stored in databases 114.

Computing device 100 may be, for example, a web-based server, a local area network server, a cloud-based server, a notebook computer, a desktop computer, an al-in-one system, a tablet computing device, a mobile phone, an electronic book reader, or any other electronic device suitable for automatically generating sub-queries. Computing device 100 may include a processor 102 and a machine-readable storage medium 104. Computing device 100 may be in communication with one or more additional computing devices. Computing device 100 may receive a query 116 (e.g., from a user operating computing device 100, from the one or more additional computing devices in communication with the computing device 100, etc.) and may return a query result 118 (e.g., to the user operating computing device 100, to the one or more additional computing devices in communication with the computing device 100, etc.).

Processor 102 may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, 110, and 112 to control a process of automatically generating sub-queries. As an alternative or in addition to retrieving and executing instructions, processor 102 may include at least one electronic circuit that includes electronic components for performing the functionality of instructions 106, 108, 110, 112, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, 110, and 112 for receiving a query 116 defining a particular set of data stored in the databases 114, accessing metadata associated with the particular set of data, selecting a data attribute associated with the particular set of data based on the metadata, automatically generating sub-queries of the query 116 using the data attribute selected, processing the sub-queries, and providing a query result 118 of the query 116, where the query result 118 is a combination of sub-query results of the sub-query.

Query processing instructions 106 may receive a query defining a particular set of data stored in databases 114. For example, query processing instructions 106 may receive a query requesting all sales data from May of the current year from all stores in California.

Metadata access instructions 108 may access metadata associated with the particular set of data defined by the query that is received by query processing instructions 106. The metadata may include any metadata associated with data in databases 114. For example, metadata access instructions 108 may access metadata relating to data tables that may be accessed for a query requesting all sales data from May of the current year from all stores in California, such as the number of unique items in the data tables, the number of attributes in the data tables, and the like.

Data attribute selection instructions 110 may select, identify, or determine, based on the metadata accessed by metadata access instructions 108, a data attribute associated with the particular set of data. A data attribute may be any characteristic, category, classification, or type of information that may be used to identify data. The selection of the data attribute may be based on metadata indicating that parameterization of that particular data attribute may result in sub-queries that may be processed relatively efficiently. For example, the metadata may indicate that parameterizing the date attribute (e.g., date, store, etc.) may result in efficient sub-queries, and as such, data attribute selection instructions 110 may select the data attribute for parameterization. In some examples, the data attribute selected may result in sub-queries that each partition a disjoint subset of the original query. In some examples, the data attribute selected is such that each sub-query produces a result that is approximately equal in size to the results of the other sub-queries. In some examples, the data attribute selected is such that the runtime for processing and combining the sub-queries is less than the runtime for processing the original query.

Sub-query generation instructions 112 may use the selected data attribute to automatically generate or create sub-queries of the query. For example, if the date attribute was selected to be parameterized daily, sub-queries corresponding to disjoint increments or ranges of data associated with the date attribute may be generated such that a sub-query for each day in the month of May of the current year may be generated.

Once the sub-queries are generated, query processing instructions 106 may analyze and process the sub-queries, combine and calculate the results of each sub-query, and provide the combined result as the result to the original query.

Databases 114 may include any suitable number and type of database. For example, databases 114 may include a star schema database containing fact tables and dimension tables.

Figure 2:
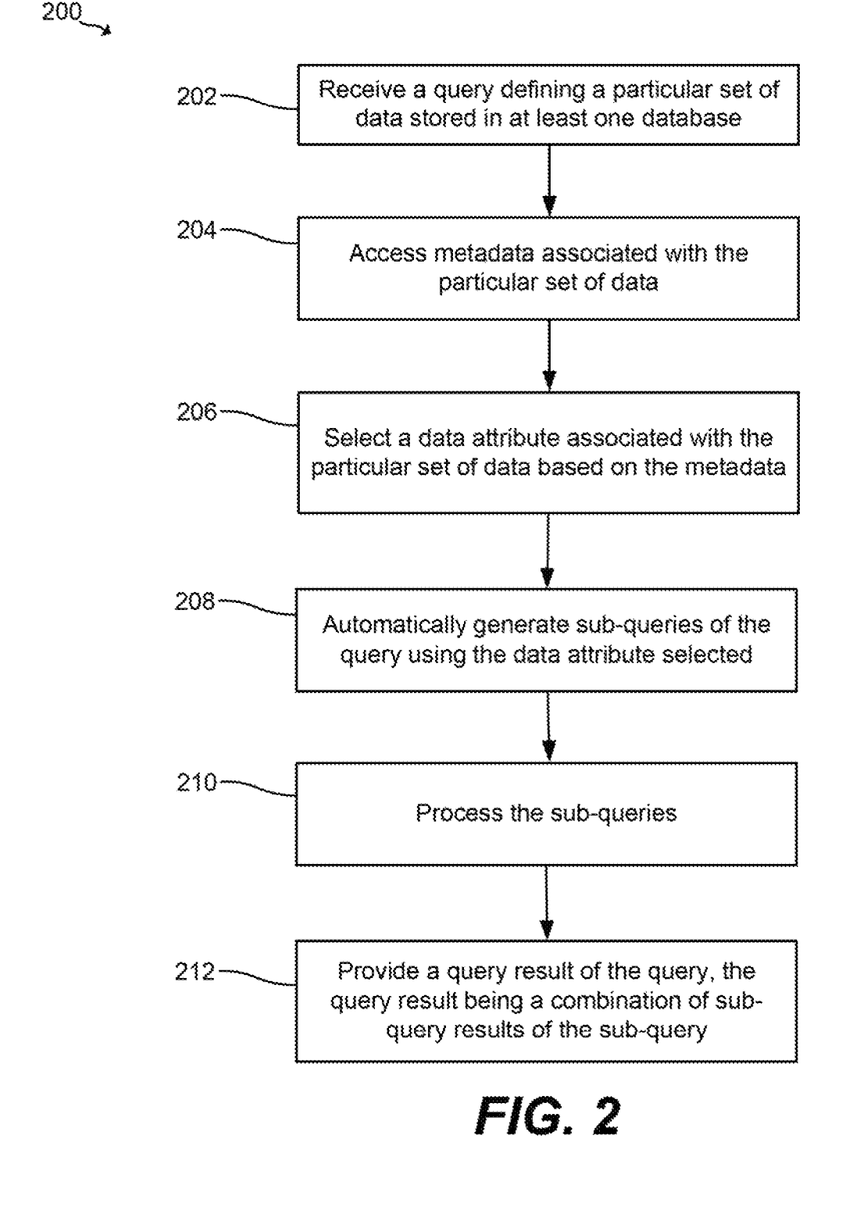
FIG. 2 is a flowchart illustrating an example method of automatically generating sub-queries.

FIG. 2 is a flowchart illustrating an example method 200 of automatically generating sub-queries. Method 200 may be implemented using computing device 100 of FIG. 1.

Method 200 includes, at 202, receiving a query defining a particular set of data stored in at least one database. For example, the query may define a set of data requested.

Method 200 also includes, at 204, accessing metadata associated with the particular set of data. The metadata may be accessed in any suitable manner. In some examples, the metadata may be stored with the database and may be accessed from the database. In some examples, a subset of the query may be processed to obtain metadata associated with the subset of the query. In some examples, the query may be processed and then stopped before completion in order to obtain relevant metadata. In some examples, a query for a subset of data may be processed to obtain relevant metadata.

Method 200 also includes, at 206, selecting a data attribute associated with the particular set of data based on the metadata. For example, the metadata may be used to determine which data attribute to use in the creation of sub-queries, to determine how to parameterize the attribute (e.g., based on the attribute data itself, based on key values associated with the attribute data in dimension tables, based on a histogram of the attribute data, etc.), and the like.

Method 200 also includes, at 208, automatically generating sub-queries of the query using the data attribute selected. The sub-queries may be automatically generated in any suitable manner. In some examples, the original query may be decomposed by partitioning the query input data based on the selected data attribute.

Method 200 also includes, at 210, processing the sub-queries. The sub-queries may be processed in any suitable manner. For example, the sub-queries may be processed by directly by an interpreter, indirectly after compilation into native machine language, and the like.

Method 200 also includes, at 212, providing a query result of the query, the query result being a combination of sub-query results of the sub-query. In some examples, the manner in which the sub-query results are combined may depend on the original query. For example, the sub-query results may be combined such that the combination of the results is the same as the results that the original query would have produced if processed in its entirety. The sub-query results may be combined in any manner (e.g., concatenation, merge operation, merge sort, limiting operation, etc.).

Figure 3:
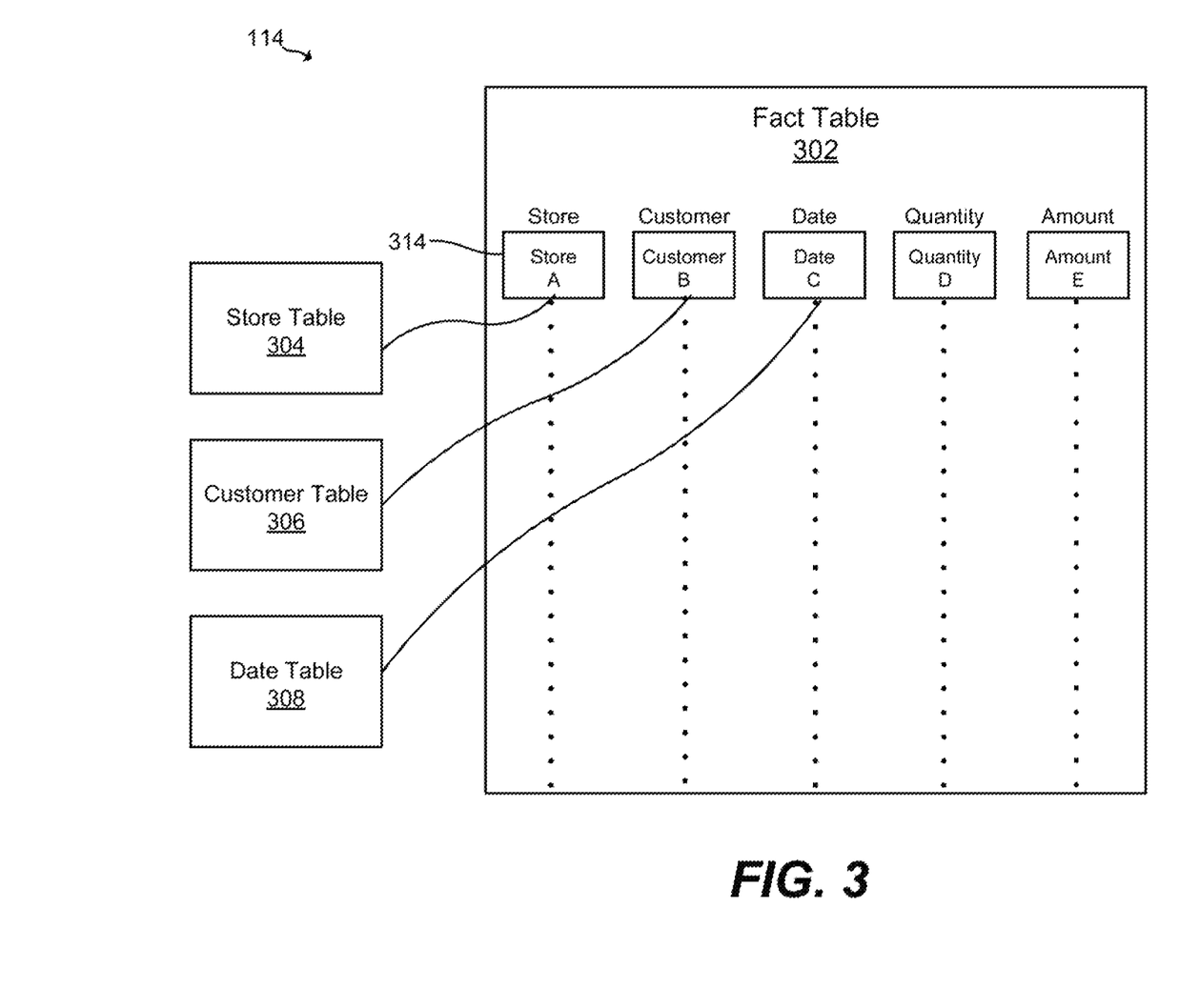
FIG. 3 is a diagram of example database tables of a database that may be used to automatically generate sub-queries.

FIG. 3 is a diagram of example database tables of a database 114 that may be used to automatically generate sub-queries. The database 114 may include fact table 302 and any number of dimension tables, such as store table 304, customer table 306, and date table 308. The database 114 may also include metadata associated with each of the tables in the database 114.

In the example of FIG. 3, fact table 302 may include information about sales for a company. The sales information in fact table 302 may include data about each sale for the company, including store information, customer information, date information, quantity information, amount information, and the like. For example, for a given sale 314, fact table 302 may include data relating to the sale 314, such as data indicating that the sale 314 was made in Store A by Customer B on Date C and that Quantity D was purchased in the amount of Amount E. The data relating to sale 314 may be included in fact table 302 in any suitable manner, such as including the actual information (e.g., Amount E is $13.42), a key value referencing data in a related dimension table, and the like.

Store table 304, customer table 306, and date table 308 may each be a dimensional table containing data associated with a column in fact table 302. For example, store table 304 may include any data associated with a company's stores (e.g., store name, address, location, size, employees, etc.). Data in the quantity and amount columns may be measurements that are included in fact table 302.

When a query for data in fact table 302 is received, sub-queries may be automatically generated based on the metadata associated with each of the tables in database 114. For example, a query requesting sales information for California stores in May of the current year may be received. The query may be automatically partitioned into thirty-one sub-queries based on the metadata (e.g., a sub-query for each day in May of the current year). These sub-queries may each be processed to return the sales for California stores on May $1^{st}$, May $2^{nd}$, May $3^{rd}$, and the like. The results from each sub-query may be combined, and the combined result may be returned as the result of the originally-received query. Sub-queries may be generated based on the metadata in database 114 using any data attribute for parameterization, such as generating sub-queries based on a date range (e.g., daily), a store location (e.g., by city), customers (e.g., by letter of last name), key values for a dimension table (e.g., key value ranges), a histogram of data in a dimension table (e.g., a histogram of sales in a given day), and the like.

Figure 4:
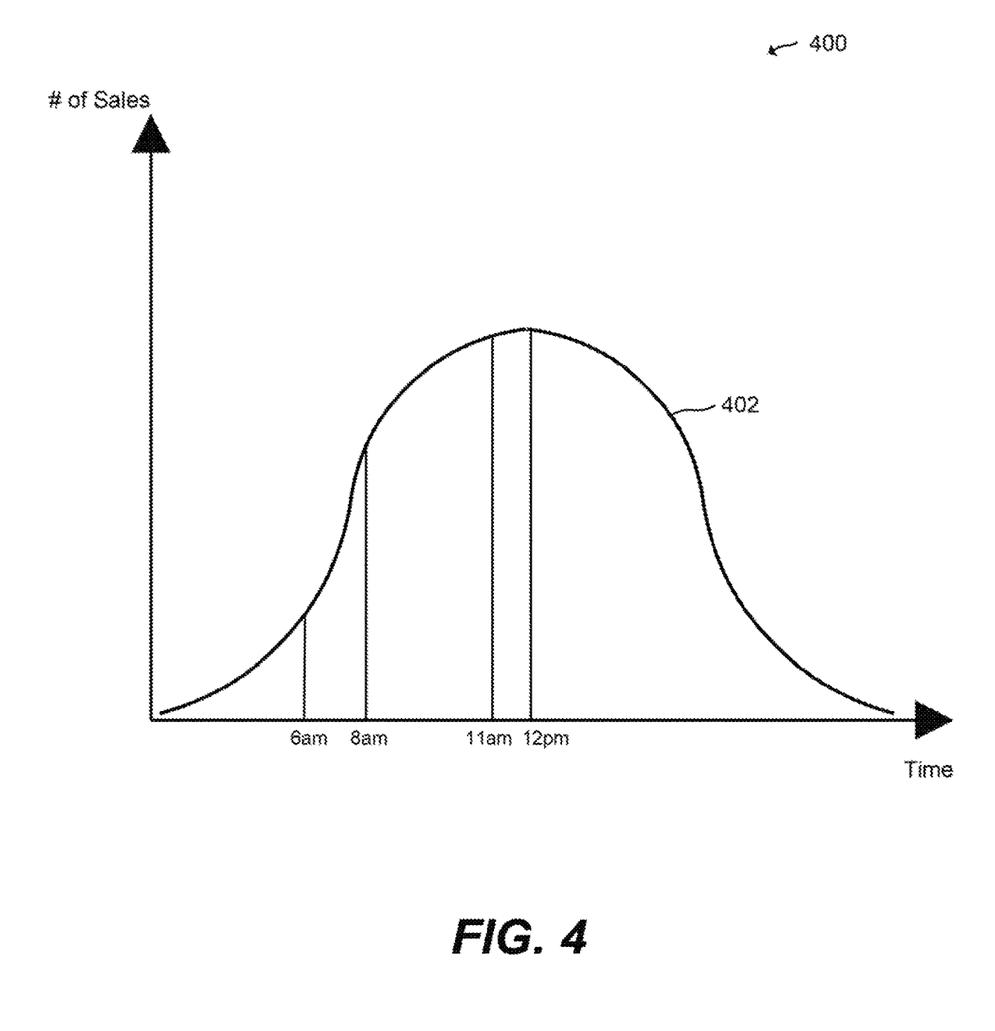
FIG. 4 is a diagram of an example histogram of data that may be used to automatically generate sub-queries.

FIG. 4 is a diagram of an example histogram 400 of data that may be used to automatically generate sub-queries. Histogram 400 shows curve 402 for the number of sales at different times of a particular day. For example, curve 402 shows that the number of sales at the beginning and end of the day are each less than the number of sales that occur in the middle of the day. The metadata associated with sales data may indicate that the distribution of sales is not equal for each hour of the day. As such, generating sub-queries by parameterizing sales by the hour may not be efficient, since processing a sub-query for the 11 am hour would take longer than processing a sub-query for the 6 am hour. Instead, the histogram 400 may be used for generating sub-queries based on curve 402. For example, a sub-query may be generated based on the area under curve 402 such that the sales are equally distributed between the sub-queries generated. For example, if the area under curve 402 between 6 am and 8am is equal to the area under curve 402 between 11 am and 12 pm, a sub-query may be generated for each of these time ranges such that processing of each of these sub-queries takes approximately the same amount of time.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing device comprising:
a processor to:
receive a query defining a particular set of data stored in at least one database; and
transform the query into a functional equivalent utilizing a plurality of sub-queries, wherein to transform the query the processor is further to:

access metadata of the particular set of data, wherein the metadata includes properties of the particular set of data and wherein the query is processed and then stopped before completion in order to access the metadata;

select a data attribute of the particular set of data based on the properties of the particular set of data, wherein the data attribute identifies the particular set of data and is selected such that each of the plurality of sub-queries produces a result that is approximately equal in size, and such that a runtime for sub-query processing and combining is less than a runtime for processing the query;

determine, prior to generating the plurality of sub-queries, how to parameterize the data attribute;

parameterize, based on the determination, the data attribute;

automatically generate the plurality of sub-queries based on the parameterized data attribute and based on a key value in a first table of the at least one database that is mapped to a corresponding entry in a second table of the at least one database, wherein the automatically generating the plurality of sub-queries includes partitioning query input data from the query;

process the plurality of sub-queries; and provide a query result for the query, the query result being a combination of sub-query results of the plurality of sub-queries, wherein the sub-query results of the plurality of sub-queries are combined according to an expected result of the query if the query was processed in its entirety.

2. The computing device of claim 1, wherein the selecting the data attribute of the particular set of data includes selecting the data attribute based on at least one of a processing time of each sub-query, a distribution of data between the sub-queries, a number of results for each sub-query, and user-specified criteria associated with the data attribute.

3. The computing device of claim 1, wherein the sub-queries correspond to disjoint ranges of data associated with the data attribute.

4. The computing device of claim 1, wherein the sub-queries correspond to disjoint ranges of key values relating to data associated with the data attribute.

5. The computing device of claim 1, wherein the automatically generating the plurality of sub-queries is further based on a histogram of data associated with the data attribute.

6. The computing device of claim 1, wherein the metadata indicates a property of data in the first table or of data in the second table.

7. The computing device of claim 6, wherein the property of data in the first table or of data in the second table is cardinality of the data attribute.

8. A method comprising:
receiving, by a computing device, a query defining a particular set of data stored in at least one database;
transforming the query into a functional equivalent utilizing a plurality of sub-queries, including:
accessing, by the computing device, metadata of the particular set of data, wherein the metadata includes properties of the particular set of data and wherein the query is processed and then stopped before completion in order to access the metadata;
identifying, by the computing device, a data attribute of the particular set of data based on the properties of the particular set of data, wherein the data attribute identifies the particular set of data and is identified such that each of the plurality of subqueries produces a result that is approximately equal in size, and such that a runtime for sub-query processing and combining is less than a runtime for processing the query;
determining, prior to generating the plurality of subqueries, how to parameterize the data attribute;
parameterizing, based on the determination, the data attribute;
automatically creating, by the computing device, the plurality of sub-queries based on the parameterized data attribute and based on a key value in a first table of the at least one database that is mapped to a corresponding entry in a second table of the at least one database, wherein the automatically generating the plurality of sub-queries includes partitioning query input data from the query;
analyzing, by the computing device, the plurality of sub-queries; and
calculating, by the computing device, a query result of the query, the query result including the plurality of sub-query results of the sub-queries, wherein the sub-query results of the plurality of sub-queries are combined according to an expected result of the query.

9. The method of claim 8, further comprising:
identifying the data attribute based on at least one of a processing time of each sub-query, a distribution of data between the sub-queries, a number of results for each sub-query, and user-specified criteria associated with the data attribute.

10. The method of claim 8, wherein the plurality of sub-queries correspond to disjoint ranges of data associated with the data attribute.

11. The method of claim 8, wherein the plurality of sub-queries correspond to disjoint ranges of key values relating to data associated with the data attribute.

12. The method of claim 8, wherein the automatically creating the plurality of sub-queries is further based on a histogram of data associated with the data attribute.

13. The method of claim 8, wherein the metadata indicates a property of data in the first table or of data in the second table.

14. The method of claim 13, wherein the property of data in the first table or of data in the second table is cardinality of the data attribute.

15. A non-transitory machine-readable storage medium storing instructions that, when executed by at least one processor of a computing device, cause the computing device to:
receive a query defining a particular set of data stored in at least one database; and
transform the query into a functional equivalent utilizing a plurality of sub-queries, wherein the instructions, when executed by the at least one processor, further cause the computing device to:
access metadata of the particular set of data, wherein the metadata includes properties of the particular set of data and wherein the query is processed and then stopped before completion in order to access the metadata;
determine a data attribute of the particular set of data based on the properties of the particular set of data, wherein the data attribute identifies the particular set of data and is determined such that each of the plurality of sub-queries produces a result that is approximately equal in size, and such that a runtime for sub-query processing and combining is less than a runtime for processing the query;

determine, prior to generating the plurality of sub-queries, how to parameterize the data attribute;

parameterizing, based on the determination, the data attribute;

automatically generate the plurality of sub-queries based on the parameterized data attribute and based on a key value in a first table of the at least one database that is mapped to a corresponding entry in a second table of the at least one database, wherein the automatically generating the plurality of sub-queries includes partitioning query input data from the query;

perform the plurality of sub-queries; and determine a query result of the query, the query result being a combination of sub-query results of the plurality of sub-queries, wherein the sub-query results of the plurality of sub-queries are combined according to an expected result of the query.

16. The non-transitory machine-readable storage medium of claim 15, wherein the instructions, when executed by the at least one processor, further cause the computing device to determine the data attribute based on at least one of a processing time of each sub-query, a distribution of data between the sub-queries, a number of results for each sub-query, and user-specified criteria associated with the data attribute.

17. The non-transitory machine-readable storage medium of claim 15, wherein the plurality of sub-queries correspond to disjoint ranges of data associated with the data attribute.

18. The non-transitory machine-readable storage medium of claim 15, wherein the plurality of sub-queries correspond to disjoint ranges of key values relating to data associated with the data attribute.

19. The non-transitory machine-readable storage medium of claim 15, wherein the automatically generating the plurality of sub-queries is further based on a histogram of data associated with the data attribute.

20. The non-transitory machine-readable storage medium of claim 15, wherein the metadata indicates a property of data in the first table or of data in the second table.

* * * * *